(12) United States Patent
Hosoi

(10) Patent No.: US 8,582,961 B2
(45) Date of Patent: Nov. 12, 2013

(54) ELECTRONIC APPARATUS, REPRODUCTION SYSTEM, REPRODUCTION METHOD, AND PROGRAM

(75) Inventor: Takahiro Hosoi, Saitama (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 13/137,177

(22) Filed: Jul. 26, 2011

(65) Prior Publication Data

US 2012/0076469 A1 Mar. 29, 2012

(30) Foreign Application Priority Data

Sep. 28, 2010 (JP) ................................. 2010-217252

(51) Int. Cl.
*H04N 5/783* (2006.01)
(52) U.S. Cl.
USPC ......................................................... 386/345
(58) Field of Classification Search
USPC .................. 386/200, 241, 345, 346
See application file for complete search history.

(56) References Cited

U.S. PATENT DOCUMENTS 6,111,979 A * 8/2000 Katto ............................ 382/154

FOREIGN PATENT DOCUMENTS

| JP | 10-327430 | 12/1998 |
| JP | 11-289555 | 10/1999 |
| JP | 2010-130495 | 6/2010 |

* cited by examiner

*Primary Examiner* — Huy T Nguyen
(74) *Attorney, Agent, or Firm* — Sony Corporation

(57) ABSTRACT

The present disclosure provides an electronic apparatus including, an acquisition portion configured to acquire video data having a plurality of picture data constituting a moving picture for reproduction of a three-dimensional moving picture, an operation portion configured to give an instruction for thin-out reproduction of the plurality of picture data acquired for three-dimensional moving picture reproduction, and a selection portion configured to select in turns the picture data for thin-out reproduction of the three-dimensional moving picture from the plurality of picture data acquired for three-dimensional moving picture reproduction, based on the thin-out reproduction instruction, wherein the selection portion selects the picture data of which the display position relative to the last-selected picture is subject to a limited change in the direction of depth.

15 Claims, 8 Drawing Sheets

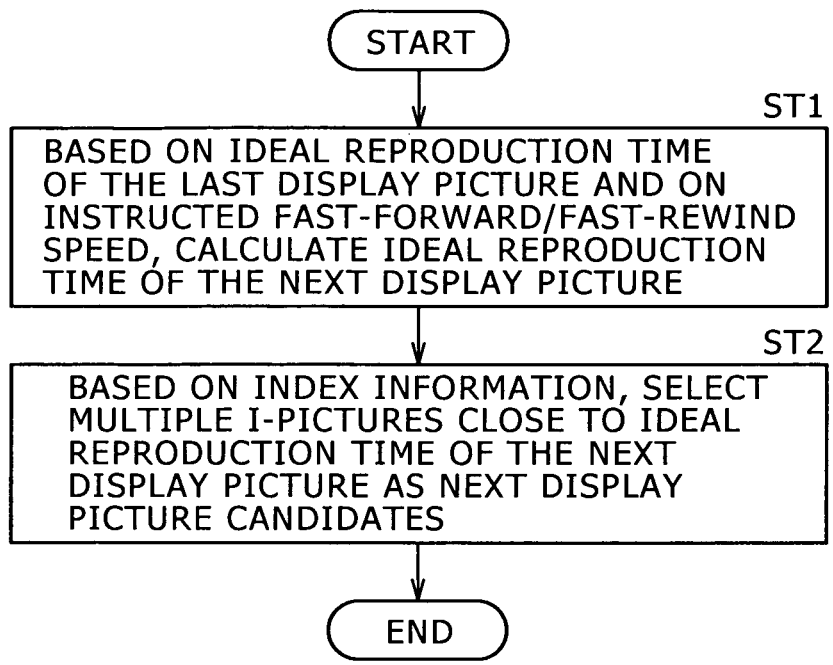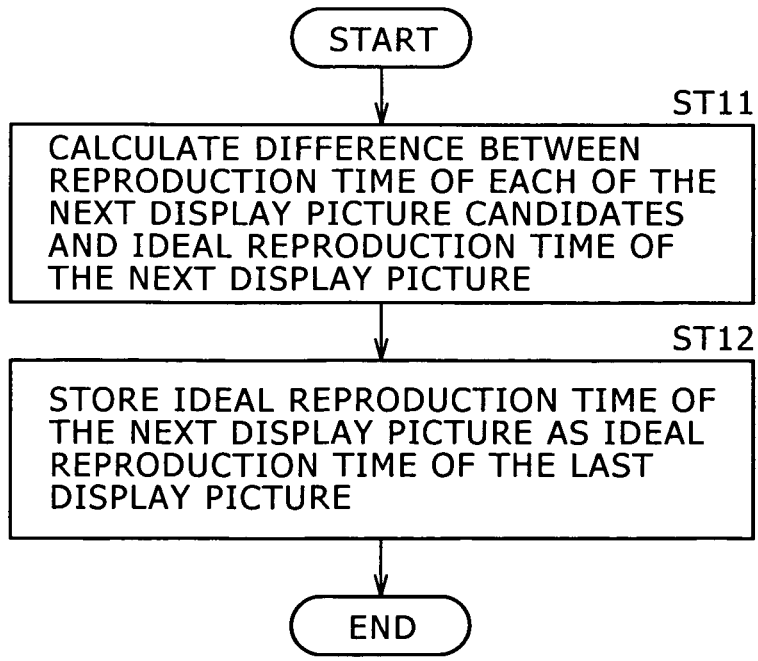

F I G . 8

START

ST21 SELECT PICTURE WHOSE TIME DIFFERENCE IS THE SMALLEST

ST22 ACQUIRE DEPTH OF CANDIDATE PICTURE

ST23 CALCULATE DIFFERENCE IN DEPTH BETWEEN THE LAST DISPLAY PICTURE AND CANDIDATE PICTURE

ST24 IS DIFFERENCE WITHIN PREDETERMINED AMOUNT?

NO → ST25 IS THERE ANY OTHER CANDIDATE PICTURE, WITH LOOP COUNT LESS THAN PREDETERMINED COUNT?

YES → ST26 SELECT PICTURE WHOSE TIME DIFFERENCE IS THE NEXT SMALLEST

NO → ST28 SELECT PICTURE WHOSE TIME DIFFERENCE IS THE SMALLEST AS THE NEXT DISPLAY PICTURE, INDICATING THE SELECTED PICTURE IS INAPPROPRIATE FOR INTRINSIC 3D DISPLAY

YES → ST27 SELECT CANDIDATE PICTURE AS THE NEXT DISPLAY PICTURE

END

ELECTRONIC APPARATUS, REPRODUCTION SYSTEM, REPRODUCTION METHOD, AND PROGRAM

BACKGROUND

The present disclosure relates to an electronic apparatus, a reproduction system, a reproduction method, and a program for reproducing three-dimensional (3D) moving pictures.

There exist reproduction apparatuses for reproducing 3D moving pictures. One such reproduction apparatus is disclosed in Japanese Patent Laid-open No. Hei 11-289555 (called the Patent Document 1 hereunder), another in Japanese Patent Laid-open No. Hei 10-327430 (called the Patent Document 2 hereunder), and another in Japanese Patent Laid-open No. 2010-130495 (called the Patent Document 3 hereunder).

The Patent Document 1 discloses a 3D video apparatus, describing position information about character information including display position information for three-dimensionally displaying the character information accompanying videos.

The Patent Document 2 discloses a telop display apparatus for use in a digital 3D broadcast, describing how a parallax is added to telop information.

The Patent Document 3 describes how right-eye display information and left-eye display information are created from menu display information based on a given degree of 3D effect.

SUMMARY

Reproduction apparatuses and other similar electronic apparatuses usually have the capability to perform fast-forward reproduction of moving pictures as well as the capability to carry out their fast-rewind reproduction.

In special reproduction mode such as fast-forward reproduction or fast-rewind reproduction, there is a possibility that during the reproduction of 3D moving pictures, the display position of the picture, of the entire picture, of an object in the picture, or of the background of the picture can abruptly change in the direction of depth.

Even if the moving picture data to be reproduced was created so as not to incur abrupt changes of display positions in the direction of depth, there still is a possibility of the display position being changed abruptly in the depth direction in thin-out reproduction such as fast-forward reproduction or fast-rewind reproduction.

The present disclosure has been made in view of the above circumstances and provides, among others, electronic apparatus such as a reproduction apparatus for not causing abrupt changes in the depth direction of the display position of 3D moving pictures during thin-out reproduction of the 3D pictures.

According to one embodiment of the present disclosure, there is provided an electronic apparatus including: an acquisition portion configured to acquire video data having a plurality of picture data constituting a moving picture for reproduction of a three-dimensional moving picture; an operation portion configured to give an instruction for thin-out reproduction of the plurality of picture data acquired for three-dimensional moving picture reproduction; and a selection portion configured to select in turns the picture data for thin-out reproduction of the three-dimensional moving picture from the plurality of picture data acquired for three-dimensional moving picture reproduction, based on the thin-out reproduction instruction; wherein the selection portion selects the picture data of which the display position relative to the last-selected picture is subject to a limited change in the direction of depth.

Preferably, upon thin-out reproduction, the selection portion may select the picture data of which the display position relative to the last-selected picture is subject to a limited change in the depth direction.

According to another embodiment of the present disclosure, there is provided a reproduction system including: a display apparatus configured to display moving pictures; and a reproduction apparatus configured to output a three-dimensional moving picture to the display apparatus; wherein the reproduction apparatus includes: an acquisition portion configured to acquire video data having a plurality of picture data constituting a moving picture for reproduction of the three-dimensional moving picture; an operation portion configured to give an instruction for thin-out reproduction of the plurality of picture data acquired for three-dimensional moving picture reproduction; and a selection portion configured to select in turns the picture data for thin-out reproduction of the three-dimensional moving picture from the plurality of picture data acquired for three-dimensional moving picture reproduction, based on the thin-out reproduction instruction; wherein the selection portion selects the picture data of which the display position relative to the last-selected picture is subject to a limited change in the direction of depth.

According to a further embodiment of the present disclosure, there is provided a reproduction method for use with an electronic apparatus having an acquisition portion, an operation portion and a selection portion, the reproduction method including: causing the acquisition portion to acquire video data having a plurality of picture data constituting a moving picture for reproduction of a three-dimensional moving picture; causing the operation portion to give an instruction for thin-out reproduction of the plurality of picture data acquired for three-dimensional moving picture reproduction; and causing the selection portion to select in turns the picture data for thin-out reproduction of the three-dimensional moving picture from the plurality of picture data acquired for three-dimensional moving picture reproduction, based on the thin-out reproduction instruction; wherein the selection portion is caused to select the picture data of which the display position relative to the last-selected picture is subject to a limited change in the direction of depth.

According to an even further embodiment of the present disclosure, there is provided a program for use with a computer connected to an operation portion, the program causing the computer to execute a procedure including: acquiring video data having a plurality of picture data constituting a moving picture for reproduction of a three-dimensional moving picture; inputting from the operation portion an instruction for thin-out reproduction of the plurality of picture data acquired for three-dimensional moving picture reproduction; and selecting in turns the picture data for thin-out reproduction of the three-dimensional moving picture from the plurality of picture data acquired for three-dimensional moving picture reproduction, based on the thin-out reproduction instruction having been input; wherein the picture data is selected of which the display position relative to the last-selected picture is subject to a limited change in the direction of depth.

Through the use of the electronic apparatus (e.g., reproduction apparatus) according to the present disclosure, the display of 3D moving pictures or the like in thin-out reproduction is prevented from changing abruptly in the direction of depth.

BRIEF DESCRIPTION OF THE DRAWINGS

FIG. 6 is a flowchart of a candidate selection process regarding the next display picture;

FIG. 7 is a flowchart of a selection reference time generation process regarding the next display picture;

FIG. 8 is a flowchart of a next display picture selection process performed on next display picture candidates;

DETAILED DESCRIPTION OF THE PREFERRED EMBODIMENTS

Some preferred embodiments of the present disclosure will now be described in reference to the accompanying drawings.

The description will be given under the following headings:

1. First embodiment (a typical reproduction system for selecting a plurality of candidate picture data upon thin-out reproduction for fast-forward or fast-rewind as well as for further selecting selection-reference picture data preferentially from these multiple candidate picture data);

2. Second embodiment (a typical reproduction system for scoring the amount of change in the depth direction of the display position of each of a plurality of candidate pictures as well as the amount of change in time regarding each of these candidate pictures, so as to select the, picture data of which the scores are the smallest); and 3. Third embodiment (a typical reproduction system configured such that from a plurality of candidate picture data of which the amounts of change in the depth direction of the display position are each smaller than a predetermined value, the system selects the picture data of which the amount of change in time is the smallest).

<1. First Embodiment>

[Configuration of the Reproduction System 1]

Figure 1:
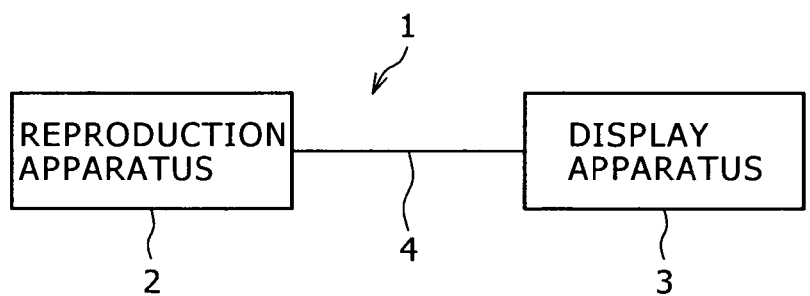
FIG. 1 is a schematic view of a reproduction system as a first embodiment of the present disclosure.

FIG. 1 is a schematic view of a reproduction system 1 as the first embodiment of the present disclosure.

The reproduction system 1 in FIG. 1 has a reproduction apparatus 2 and a display apparatus 3.

The reproduction apparatus 2 and display apparatus 3 are interconnected by an AV (audio visual) cable 4 such as an HDMI (High-Definition Multimedia Interface) cable.

Upon thin-out reproduction for fast-forward or fast-rewind, the reproduction apparatus 2 of the first embodiment selects a plurality of candidate picture data and further selects selection-reference picture data preferentially from these multiple candidate picture data.

For example, the reproduction apparatus 2 may be a reproduction apparatus that uses recording medium such as Blu-ray disks, or a hard disk reproduction apparatus.

Upon reproduction, the reproduction apparatus 2 acquires video data 21 of moving pictures from recording medium or from a hard disk so as to create the video data 21 for 3D moving picture reproduction.

If operations are carried out for fast-forward or fast-rewind, the reproduction apparatus 2 creates the video data 21 of which the pictures have been thinned out in accordance with the fast-forward or fast-rewind speed in effect.

In the case of special reproduction such as fast-forward or fast-rewind, the reproduction apparatus 2 selects a plurality of pictures for the thin-out reproduction from a plurality of pictures of the acquired video data 21, thus creating the video data 21 made up of the multiple pictures having been selected.

The reproduction apparatus 2 outputs the video data 21 thus created to the display apparatus 3 through the AV cable 4.

For example, the display apparatus 3 may be a liquid crystal display apparatus 3 or a projector type display apparatus 3.

When the video data 21 is input via the AV cable 4, the display apparatus 3 causes a display section 51 to display the corresponding video.

In the manner described above, the reproduction system 1 shown in FIG. 1 allows the display apparatus 3 to display 3D moving pictures reproduced by the reproduction apparatus 2.

For thin-out reproduction such as fast-forward or fast-rewind, the reproduction apparatus 2 selects part of a plurality of pictures constituting the video data 21. The display apparatus 3 proceeds to display the 3D moving picture made up of the selected part of the pictures.

Figure 2:
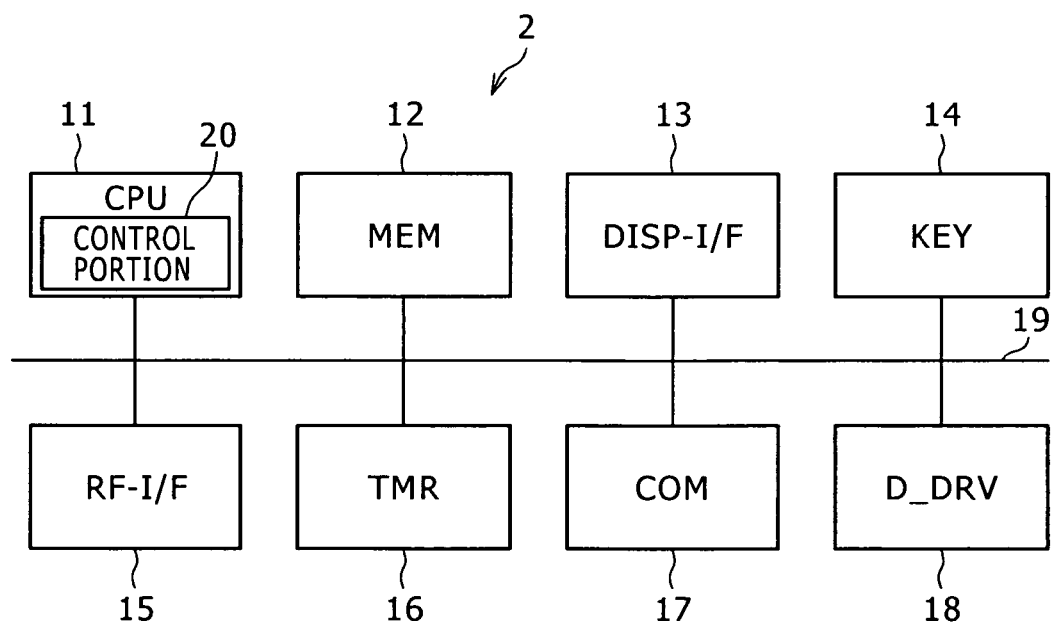
FIG. 2 is a hardware block diagram of a reproduction apparatus included in FIG. 1.

FIG. 2 is a hardware block diagram of the reproduction apparatus 2 included in FIG. 1.

The reproduction apparatus 2 in FIG. 2 has a computer made up of a CPU (central processing unit) 11, a memory (MEM) 12, a display interface (DIS_I/F) 13, and an operation portion (KEY) 14. Also, the reproduction apparatus 2 includes a wireless communication portion (RF_I/F) 15, a timer (TMR) 16, a network communication portion (COM) 17, a disk drive (D_DRV) 18, and a system bus 19 that interconnects these components.

For example, the memory 12 may be composed of a hard disk drive, a ROM, and/or a RAM.

The memory 12 stores control programs for use by the reproduction apparatus 2.

The memory 12 may also store the video data 21. The memory 12 outputs the stored video data 21 to the CPU 11.

The disk drive 18 reads the video data 21 from recording medium such as a Blu-ray disk or a DVD (Digital Versatile Disk). The disk drive 18 retrieves the video data 21 from the recording medium attached thereto.

The disk drive 18 outputs the retrieved video data 21 to the CPU 11.

The network communication portion 17 may be connected with a LAN (Local Area Network) cable, for example.

The network communication portion 17 may communicate with external entities such as a content server on the Internet and receive the video data 21 therefrom.

The network communication portion 17 outputs the received video data 21 to the CPU 11.

The video data 21 received by the network communication portion 17 is written to the memory 12 or to the recording medium attached to the disk drive 18.

The operation portion 14 may be mounted on, say, the front panel of the housing of the reproduction apparatus 2. The operation portion 14 has a plurality of operation keys.

Such functions as selection, reproduction, stop, pause, fast-forward, and fast-rewind of the video data 21 are assigned to the plurality of operation keys. The operation portion 14 may also be equipped with a jog dial or the like for adjusting reproduction speed.

The operation portion 14 outputs to the CPU 11 instructions corresponding to the operation keys that have been operated.

The wireless communication portion 15 communicates wirelessly with a remote controller for the reproduction apparatus 2.

The remote controller has a plurality of operation keys. Such functions as selection, reproduction, stop, pause, fast-forward, and fast-rewind of the video data 21 are assigned to the plurality of operation keys of the remote controller.

The wireless communication portion 15 outputs to the CPU 11 instructions corresponding to the operation keys that have been operated on the remote controller.

The display interface 13 is connected with the AV cable 4.

The display interface 13 outputs the video data 21 input from the CPU 11 or from other sources onto the AV cable 4.

The timer 16 counts time and measures the time of day.

The timer 16 outputs the counted time and the measured time of day to the CPU 11.

The CPU 11 reads programs from the memory 12 and executes the read programs.

The execution of the relevant programs enables the CPU 11 to implement a control section 20 of the reproduction apparatus 2.

The control section 20 controls the reproduction apparatus 2 in operation.

For example, the operation portion 14 and wireless communication portion 15 input instructions to reproduce the video data 21 to the control section 20 through the system bus 19.

The control section 20 reads the video data 21 to be reproduced from the memory 12 or from other sources.

From the acquired video data 21, the control section 20 creates video data 21 for reproducing 3D moving pictures. If the video data 21 is found compressed, the control section 20 decodes the acquired video data.

The control section 20 outputs the video data 21 created for 3D moving picture reproduction to the display interface 13.

Furthermore, the instructions for thin-out reproduction such as fast-forward or fast-rewind reproduction are input to the control section 20.

The control section 20 reads the video data 21 to be reproduced from the memory 12 or from other sources.

Upon thin-out reproduction, the control section 20 selectively decodes part of the pictures (e.g., I-pictures, to be discussed later) making up the acquired video data 21, thus creating the video data 21 for 3D moving picture reproduction.

The control section 20 outputs the video data created for 3D moving picture reproduction to the display interface 13.

[Explanation of Thin-Out Reproduction]

Figure 3:
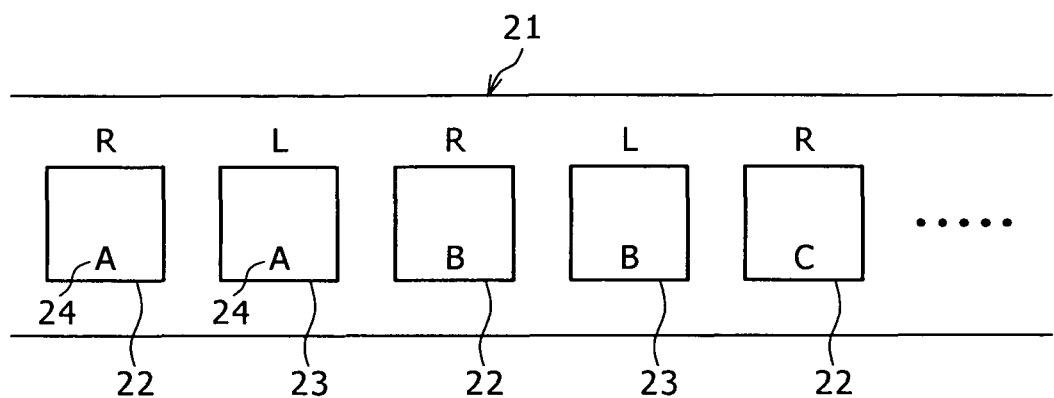
FIG. 3 is an explanatory view of video data acquired for reproduction of 3D moving pictures on the reproduction apparatus of FIG. 2.

FIG. 3 is an explanatory view of the video data 21 acquired for reproduction of 3D moving pictures on the reproduction apparatus 2 of FIG. 2.

The video data 21 shown in FIG. 3 may be recorded to the memory 12 or to a Blu-ray disk, for example.

For example, the video data 21 handled by the reproduction apparatus 2 may include MPEG (Moving Picture Experts Group) 2 transport streams, AVI (Audio Video Interleaving) data, and MP4 (MPEG-4) data. In these video data 21, streaming data such as moving picture data and audio data are multiplexed.

The moving picture data of the video data 21 is made up of a plurality of pictures including I-pictures, B-pictures and P-pictures. In the video data 21, the moving picture data is compressed by any one of such video compression schemes as MPEG-2, MPEG-4, and H.264/AVC.

During ordinary reproduction, the multiple pictures shown in FIG. 3 are used for reproduction sequentially from left to right.

Where the video data 21 is recorded compressed, the multiple pictures in FIG. 3 may or may not be stored in the order in which the pictures are to be reproduced sequentially from left to right. For example, in the case of inter-frame prediction coding, the order in which these pictures are decoded is different from the order in which they are to be reproduced.

For that reason, the video data 21 has index information covering I-picture data storage locations, I-picture display times (order of reproduction), and link information for connecting the video with subtitles 24 displayed at the same time, for example.

Also, the video data 21 shown in FIG. 3 is data for 3D moving picture reproduction.

For that reason, the video data 21 in FIG. 3 is composed of left-eye pictures 22 and right-eye pictures 23.

When each pair of left-eye and right-eye pictures 22 and 23 is reproduced, one 3D picture is displayed.

In the video data 21 in FIG. 3, the left-eye pictures 22 and right-eye pictures 23 are shown separated.

If the display apparatus 3 supports reproduction at frame rates at least twice as high as ordinary rate, then the display apparatus 3 can reproduce 3D pictures at a frame rate comparable to that of ordinary 2D pictures.

Each of the pictures shown in FIG. 3 has subtitles 24 therein.

In each pair of left-eye and right-eye pictures 22 and 23, the same subtitles 24 are displayed in staggered positions in the pictures.

In like manner, display objects such as the subtitles 24 appear staggered in the left-eye and right-eye pictures 22 and 23.

When viewing the reproduced video data 21, a viewer 32 may arrange to wear a pair of 3D picture glasses of which the shutter is controlled by a signal synchronized with the frame rate (picture rate) of the video data 21, for example.

The arrangement above presents the viewer 32 with 3D moving pictures being displayed.

Figure 4:
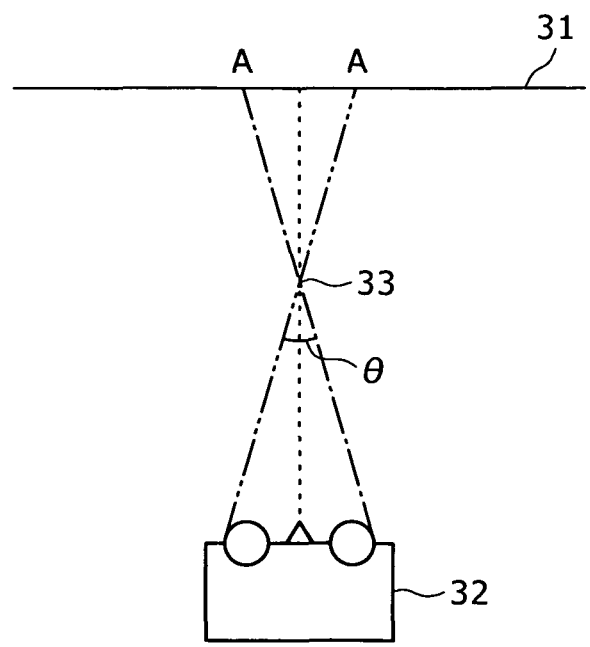
FIG. 4 is an explanatory view of a stereoscopic view given by the video data shown in FIG. 3.

FIG. 4 is an explanatory view of a stereoscopic view given by a pair of left-eye and right-eye pictures 22 and 23.

FIG. 4 illustrates a screen 31 of the display section 51 and the two eyes of the viewer 32.

The screen 31 actually displays two pictures: the left-eye picture 22 and the right-eye picture 23.

The viewer 32 is positioned in front of the screen 31.

In FIG. 4, the screen 31 is shown giving the left-eye and right-eye display positions of a subtitle part "A" as the display object.

The left-eye display position is on the right of the center of the screen 31.

The right-eye display position is on the left of the center of the screen 31.

In such a case, the viewer 32 may first look at the subtitle part "A" in the left-eye display position of the left-eye picture 22 with the left eye and then look at the subtitle part "A" in the right-eye display position of the right-eye picture 23 with the right eye.

This allows the viewer 32 to recognize the subtitle part "A" as if it were displayed at an intersection point 33 of the viewer's lines of sight in front of the screen 31.

The viewer 32 sees the subtitle part "A" floating in front of the screen 31.

That is the effect of binocular parallax causing the display positions of pictures, display objects, subtitles 24, etc., to appear varying in the depth direction of the screen 31. This allows the viewer 32 to see 3D moving pictures.

The angle formed by a line segment connecting the left eye with the intersection point of the lines of sight and by a line segment connecting the right eye with the same intersection point is called the parallactic angle θ.

Given a reproduction instruction from the operation section 14, the control section 20 of the reproduction apparatus 2 acquires the video data 21 for 3D moving picture reproduction from the memory 12 or from the recording medium.

The control section 20 acquires a plurality of picture data from the acquired video data 21.

For ordinary reproduction, the control section 20 acquires multiple picture data in the order in which they were recorded. The control section 20 decodes the acquired picture data, rearranges the decoded data into the order in which they are to be reproduced, and outputs the picture data at time intervals corresponding to a predetermined frame rate of reproduction.

For thin-out reproduction, the control section 20 acquires a plurality of I-picture data based on index information. The control section 20 decodes the acquired I-picture data and outputs the decoded data one after another.

The picture data output from the control section 20 are input to the display apparatus 3 through the display interface 13 and AV cable 4.

The display apparatus 3 updates the picture displayed on the display section 51 by use of the last-input picture data.

Meanwhile, during reproduction of 3D moving pictures, the viewer 32 may be physiologically affected if the parallactic angle θ of the pictures changes abruptly in temporal or spatial terms.

Unlike 3D still pictures, 3D moving pictures cannot be measured for the degree of adverse physiological effects simply in terms of parallax. Still, it is commonly agreed that the temporal or spatial change in parallactic angle should be limited preferably to within one degree or to within two degrees as much as possible.

Also, it is agreed that the effect of change in parallactic angle in 3D moving pictures should take into consideration not only the simple magnitude of the change involved but also the rate of the change.

For example, it is agreed that the parallactic angle θ of 3D still pictures need only fall within the range of 60 to 70 arc-minutes (one arc-minute is one-sixtieth of one degree). With 3D moving pictures, however, even if that angle range is met, physiological effects may still result from an abrupt change in parallactic angle θ.

Furthermore, with 3D still pictures, the level of visual strain is considered the same as with 2D still pictures as long as binocular parallax falls within focal depth. With 3D moving pictures, even where binocular parallax falls within focal depth, if the display position of pictures or other objects changes a certain number of times or varies with a certain frequency, then the viewer can be physiologically affected thereby.

For such reasons, in the case of the video data 21 for 3D moving picture reproduction using stereogram technology, it is preferable to create a plurality of pictures in a manner not affecting the viewer 32 physiologically.

At least with regard to the display object such as the subtitles 24 particularly noticeable by the viewer 32, it is preferable to create changes in the depth direction of the display position of the object in such a manner as not to affect the viewer physiologically.

Thus the video data 21 for 3D moving picture reproduction is created in such a manner that the change in the depth direction of the display position is minimized for ordinary reproduction where picture data are to be reproduced sequentially.

However, even if the video data 21 for 3D moving picture reproduction has been created by taking potential physiological effects into consideration, the change per unit time in the depth direction can still become abrupt where pictures are thinned out for reproduction as in fast-forward or fast-rewind.

In order to suppress such an abrupt change per unit time in the depth direction, it is conceivable to utilize only one of the paired pictures for thin-out reproduction.

However, arranging to use only one of the paired pictures for reproduction necessarily results in the display of 2D pictures. This arrangement defeats the initial purpose of obtaining the 3D effect.

[Explanation of the Thin-Out Reproduction Function]

Figure 5:
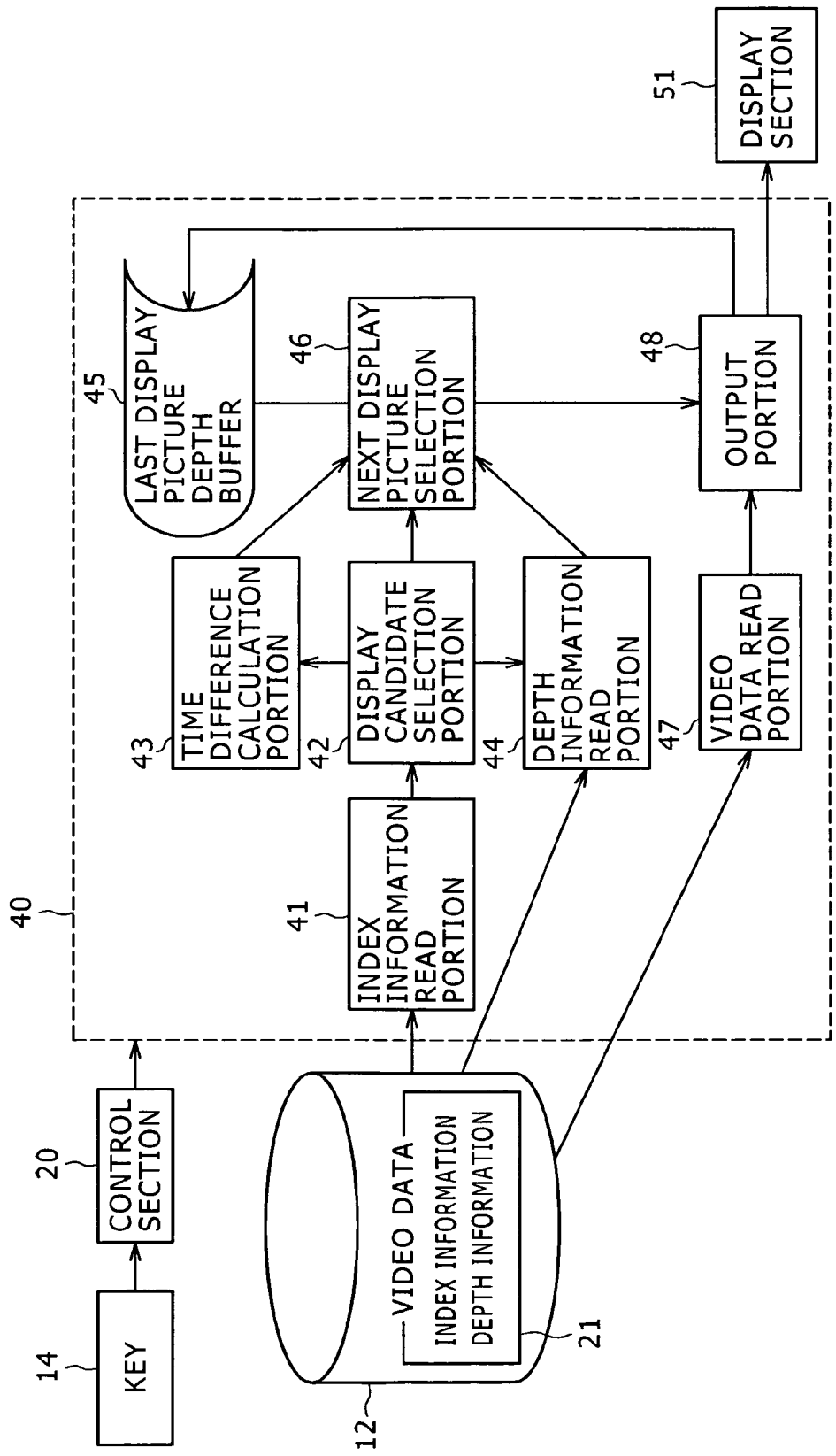
FIG. 5 is a block diagram of a thin-out reproduction section.

FIG. 5 is a block diagram of a thin-out reproduction section 40.

Along with the thin-out reproduction section 40, FIG. 5 shows the operation portion 14, control section 20, the video data 21 held in the memory 12, and the display section 51 of the display apparatus 3.

The thin-out reproduction section 40 shown in FIG. 5 is implemented by the CPU 11 loading and executing relevant programs. The thin-out reproduction section 40 is implemented together with part or all of the control section 20.

The thin-out reproduction section 40 in FIG. 5 is utilized when the operation portion 14 gives instructions for ordinary reproduction, or when the operation portion 14 gives instructions for fast-forward or fast-rewind reproduction.

The thin-out reproduction section 40 includes an index information read portion 41, a display candidate selection portion 42, a time difference calculation portion 43, a depth information read portion 44, a last display picture depth information buffer 45, a next display picture selection portion 46, a video data read portion 47, and an output portion 48.

From the video data 21 held in the memory 12, the thin-out reproduction section 40 in FIG. 5 selects video picture data one at a time for sequential display in thin-out reproduction.

The video data 21 stored in the memory 12 includes information about the subtitles 24 and depth information about the display position of the subtitles 24, in addition to a plurality of picture data constituting moving picture data.

The information about the subtitles 24 is stored in the video data 21 as a single set of content data, as with video and audio data, for example.

The index information read portion 41 reads index information about the video data 21 from the memory 21.

The index information covers the data storage locations of the I-pictures constituting moving pictures, I-picture display times (order of reproduction), and link information for connecting with the video or with the subtitles 24 that can be displayed at the same time, for example. The link information connects each picture with the corresponding subtitles 24.

The display candidate selection portion 42 selects a plurality of picture data from the video data 21 in the memory 12 on the basis of the index information.

In the ensuing description, the picture data selected by the display candidate selection portion 42 will be referred to as the candidate picture data.

The time difference calculation portion 43 calculates the reproduction time of each of the selected plurality of candidate picture data in ordinary reproduction.

The depth information read portion 44 reads the depth information about the display position of subtitle data from the memory 12.

The last display picture depth information buffer 45 stores the display position information in the depth direction about the subtitles 24 of the last display picture.

More specifically, the last display picture depth information buffer 45 stores the display position information in the depth direction about the subtitles 24 linked to the picture data that was last output by the output portion 48 to the display section 51.

The next display picture selection portion 46 selects one of a plurality of candidate picture data through a predetermined selection process.

The picture data selected by the next display picture selection portion 46 constitutes the picture to be displayed next on the display section 51.

The video data read portion 47 reads from the memory 12 the picture data selected by the next display picture selection portion 46. The video data read portion 47 decodes the read picture data, and outputs the decoded picture data.

The output portion 48 outputs the picture data sent from the video data read portion 47 to the display section 51.

As needed, the output portion 48 may also adjust the display position of the entire picture in 3D form based on picture data, of a display object in the picture, the background of the picture, of the subtitles 24 of the picture, etc., in the direction of depth.

[Operation of Thin-Out Reproduction]

The thin-out reproduction operation performed by the thin-out reproduction section 40 shown in FIG. 5 is explained below.

From the video data 21 held in the memory 12, the thin-out reproduction section 40 in FIG. 5 selects video picture data one at a time for sequential thin-out reproduction.

The operation portion 14 gives the control section 20 instructions for thin-out reproduction in fast-forward or fast-rewind in accordance with the operations performed on the operation keys to which the fast-forward or fast-rewind function is assigned.

Given the instructions input from the operation portion 14, the control section 20 starts the thin-out reproduction section 40 shown in FIG. 5.

FIG. 6 is a flowchart of a candidate selection process regarding the next display picture.

In the process of FIG. 6, the display candidate selection portion 42 first calculates an ideal reproduction time of the next display picture based on the ideal reproduction time of the last display picture and on the instructed fast-forward or fast-rewind reproduction speed (in step ST1).

The ideal reproduction time of the last display picture refers to the ideal reproduction time calculated regarding the last display picture on the basis of the instructed fast-forward or fast-rewind reproduction speed.

For example, if pictures are selected at a rate of one per every 60 pictures from 60-fps streams and if each selected picture is displayed (i.e., held) at intervals of two pictures, that amounts to 30× speed. In this case, the ideal time for display at 30× speed is one second later.

Next, the display candidate selection portion 42 selects a plurality of I-pictures close to the ideal reproduction time of the next display picture based on I-picture display sequence information in the index information (in step ST2).

For example, the display candidate selection portion 42 may select the I-picture closest to the ideal reproduction time of the next display picture, as well as I-pictures immediately preceding and immediately following the I-picture selected as the closest.

In this manner, the display candidate selection portion 42 selects multiple I-pictures as candidate pictures.

The display candidate selection portion 42 selects the candidate picture data closest to the ideal reproduction time as the selection-reference picture data to be selected corresponding to the instructed thin-out reproduction speed, as well as the picture data immediately preceding and immediately following the selection-reference picture data.

When the display candidate selection portion 42 selects a plurality of I-pictures as the candidate pictures, the time difference calculation portion 43 and depth information read portion 44 start operating.

FIG. 7 is a flowchart of a selection reference time generation process regarding the next display picture.

The time difference calculation portion 43 calculates the difference between the reproduction time of each of the candidate picture data and the ideal reproduction time of the next display picture (in step ST11).

Next, the time difference calculation portion 43 stores a plurality of pieces of the calculated time difference information about the multiple candidate picture data (in step ST12). The multiple pieces of the time difference information may be stored into the memory 12, for example.

Also, from the memory 12, the depth information read portion 44 reads depth information about the subtitles 24 of each of the candidate picture data.

The depth information read portion 44 then stores a plurality of pieces of depth information about the subtitles 24 of the multiple candidate picture data. The plurality of pieces of depth information may be stored into the memory 12, for example.

In this manner, the memory 12 stores the time difference information about the multiple candidate picture data and the depth information about the subtitles 24 regarding these candidate picture data.

Alternatively, the time difference information and the depth information about the subtitles 24 may be stored in the memory 12 in correspondence with each of the index numbers pointing to the candidate picture data.

FIG. 8 is a flowchart of a next display picture selection process performed on next display picture candidates.

When the time difference information about the multiple candidate picture data and the depth information about the subtitles 24 regarding these candidate picture data are stored into the memory 12, the next display picture selection portion 46 selects the next display picture.

The next display picture selection portion 46 first selects the candidate picture data whose time difference is the smallest (in step ST21).

The next display picture selection portion 46 then acquires the depth information about the subtitles 24 regarding the current candidate picture data (in step ST22). The next display picture selection portion 46 proceeds to calculate the difference in the depth of the subtitles 24 between the last display picture and the current candidate picture data (in step ST23).

The depth information about the subtitles 24 regarding the last display picture data is read from the last display picture depth information buffer 45.

The next display picture selection portion 46 determines whether the depth difference of the subtitles 24 is within a predetermined value (in step ST24).

If the depth difference of the subtitles 24 is found within the predetermined value, the next display picture selection portion 46 selects the candidate picture data with the smallest time difference as the picture data to be displayed next (in step ST27).

If the depth difference of the subtitles 24 is found larger than the predetermined value, the next display picture selection portion 46 continues selecting the next candidate picture.

More specifically, the next display picture selection portion 46 determines whether there still exists any other candidate picture yet to be processed and whether the loop count currently in effect is less than a predetermined count (e.g., 4) (in step ST25).

If the result of the determination in step ST25 is affirmative ("YES"), then the next display picture selection portion 46 selects the candidate picture whose time difference is the next smallest (in step ST26).

The next display picture selection portion 46 calculates the depth difference of the subtitles in the current candidate picture data whose time difference is the next smallest, and determines whether the depth difference is within the predetermined values (in steps ST22 through ST24).

If the depth difference of the subtitles 24 is found within the predetermined value, the next display picture selection portion 46 selects the candidate picture data whose time difference is the next smallest as the picture data to be displayed next (in step ST27).

If the depth difference of the subtitles 24 is found larger than the predetermined value, the next display picture selection portion 46 continues selecting the next candidate picture.

The next display picture selection portion 46 continuously performs its loop process (in steps ST25, ST26, and ST22 through ST24).

If the result of the determination in step ST25 is negative ("NO"), then the next display picture selection portion 46 selects the candidate picture whose time difference is the smallest as the picture data to be displayed next (in step ST28).

In this case, the next display picture selection portion 46 notifies the output portion 48 that the next display picture selected is not appropriate for intrinsic 3D display.

When the next display picture selection portion 46 has selected the picture data to be displayed next, the video data read portion 47 reads the picture data in question from the memory 12.

The output portion 48 outputs the picture data sent from the video data read portion 47 to the output portion 51.

If the next display picture selection portion 46 has notified the output portion 48 that the selected picture data is not appropriate, the output portion 48 adjusts the depth of the subtitles 24 or other objects to be displayed based on the picture data in question, before outputting the picture data to the display section 51.

The display section 51 displays the newly input picture data.

In this manner, the display section 51 displays 3D moving pictures in thin-out reproduction.

Also, the display section 51 updates the depth information held in the last display picture depth information buffer 45 using the depth information about the newly displayed subtitles 24 or other objects.

Through the thin-out reproduction process described above, the display section 51 displays the 3D moving pictures thinned out in accordance with the instructions from the operation portion 14.

[Operation of Depth (Display Position) Adjustment]

Figure 9:
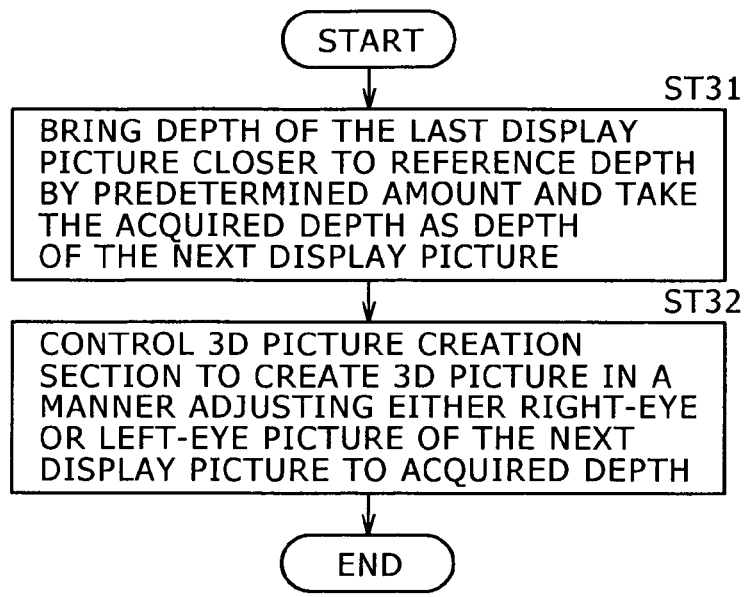
FIG. 9 is a flowchart of a 3D picture creation process (depth adjustment process) regarding the next display picture.

FIG. 9 is a flowchart of a 3D picture creation process (depth adjustment process) regarding the next display picture. The 3D picture creation process is carried out where it is difficult to obtain videos with appropriate changes in the depth direction.

In the 3D picture creation process, the depth in the display position of the next display picture is adjusted in such a manner that the amount of change in the depth direction regarding the entire picture, display objects, subtitles 24, etc., falls within a predetermined value.

For example, if the next display picture selection portion 46 has notified the output portion 48 that the selected picture data is not appropriate, the output portion 48 performs the depth adjustment process on the subtitles 24 or other objects displayed on the basis of the picture data to be displayed next.

In the depth adjustment process on the subtitles 24 or other objects, the output portion 48 first brings the depth of the last display picture closer to a reference depth by a predetermined amount and takes the acquired depth as the depth of the next display picture (in step ST31). For example, the predetermined amount may be 80 percent.

The output portion 48 determines the depth applicable to the next display picture after reading the depth of the last display picture from the last display picture depth information buffer 45, for example.

It should be noted that the reference depth is typically the surface of the screen 31 of the display section 51.

If the subtitles 24 in FIG. 2 are the subtitles 24 last displayed, the output portion 48 determines as the depth of the next display picture the position reached by bringing the intersection point in FIG. 2 closer to the screen 31 by the predetermined amount.

Next, the display section 48 adjusts the display position of the next display picture so that the display position of the subtitles 24 and other objects in the next display picture coincides with the determined depth (in step ST32).

In the video data 21 of FIG. 3, each pair of left-eye and right-eye pictures 22 and 23 is used to form a 3D picture.

Thus the output portion 48 makes adjustments so that either of the left-eye and right-eye pictures 22 and 23 constitutes a 3D picture in the acquired display position.

Typically from the left-eye picture 22, the output portion 48 may create picture data of which the display position is shifted toward the center of the line of sight shown in FIG. 3. The output portion 48 outputs the data of the left-eye picture 22 thus created.

For example, during the 3D picture creation process, the output portion 48 may adjust the display position on the assumption that the left-eye or right-eye picture 22 or 23 is a plane.

In the 3D picture creation process, adjustments may be made in such a manner that the object displayed using the left-eye and right-eye pictures 22 and 23 apparently in the foreground of the screen will have a reduced gap between its display position and the screen. Adjustments may also be made so that the object displayed apparently in the background of the screen will have a reduced gap between its display position and the screen. If there exist a plurality of objects being displayed, only the object positioned nearest in the foreground or farthest in the background may be adjusted in its display position.

[Specific Examples of Depth (Display Position) Adjustment Operations]

Suppose that there is a stream of video data 21 including an I-picture per every 15 frames, flowing at 30 frames a minute. An I-picture is generated every 0.5 seconds.

In the case above, if one I-picture is selected out of every four pictures and if each I-picture is held for a time period of six frames (for freeze display), then a video with a reproduction time of two seconds will be displayed in 0.2 seconds. The fast-forward speed in this case is 10×.

Now consider the case where the I-pictures next to each intrinsic I-picture are to be selected.

If a video with a reproduction time of 1.5 seconds is reproduced (put on hold) in 0.2 seconds, the reproduction speed is 7.5×.

If a video with a reproduction time of 2.5 seconds is reproduced (put on hold) in 0.2 seconds, the reproduction speed is 12.5×.

The fluctuating range of the fast-forward reproduction speeds above is 25 percent.

In these cases, the display candidate selection portion 42 selects the I-pictures immediately preceding and immediately following each intrinsic I-picture.

The next display picture selection portion 46 selects one of these three I-pictures.

The output portion 48 outputs the selected I-picture data.

The output portion 48 then outputs the next selected I-picture data in 0.2 seconds.

In the above-mentioned examples, the hold time of each I-picture was shown fixed to 0.2 seconds. Alternatively, the hold time may be adjusted otherwise.

For example, if the selected I-picture has a reproduction time of 1.5 seconds, the hold time may be adjusted to 0.15 seconds.

If the selected I-picture has a reproduction time of 2.5 seconds, the hold time may be adjusted to 0.25 seconds.

These adjustments make it possible to keep the overall fast-forward reproduction speed substantially constant.

Due to the above-described depth (display position) adjustment process, the display section 51 of the first embodiment displays 3D moving pictures of which the display position for thin-out reproduction in the depth direction varies within a predetermined reference value.

Thus with the first embodiment, 3D moving pictures displayed during thin-out reproduction are subject to appreciably smaller changes in the depth direction of their display position than if the selection-reference picture data are selected in a simply sequential manner. This makes it possible to minimize abrupt changes occurring in the display position of the entire picture, display objects, subtitles 24, etc.

Also in thin-out reproduction, there are cases where it is difficult to select pictures of which the amount of change in the display position in the depth direction would fall within a predetermined range relative to the display position of the last-selected picture data.

In such cases, the first embodiment allows the amount of change in the display position in the depth direction to fall within the predetermined range with regard to the pictures actually displayed for thin-out reproduction.

In particular, if the amount of change in the depth direction regarding the display position of the selection-reference picture data is within the predetermined range, the first embodiment selects the selection-reference picture data. Otherwise the first embodiment selects the picture data before and after which the amount of change in the depth direction falls within the predetermined range.

The selection-reference picture data are selected preferentially, and the picture data having smaller time differences relative to the selection-reference picture data are further preferred in the selection to those with larger time differences.

Thus if the amount of change in the depth direction is made to fall within the predetermined range, the fluctuation in the speed of thin-out reproduction is reduced to a strict minimum.

Furthermore, the first embodiment takes note of the subtitles 24 and makes determination based on the depth of the subtitles 24.

The subtitles 24 are the picture part to which the viewer 32 pays particular attention in order to take in their meaning in a short time.

In 3D moving pictures, the subtitles 24 can be difficult for the viewer to focus on if they are shown buried in, or floating above, the surrounding background or other display objects.

For that reason, the subtitles 24 are usually adjusted in their display position so that they are shown displayed in the surrounding background or on the surface of other display objects.

The depth information about the subtitles 24 is generally prepared in a manner permitting the feature above.

Thus the first embodiment is designed to prevent the depth of the subtitles 24 or other objects from changing abruptly based on the display position information about the subtitles 24 or other objects. This makes it possible to minimize abrupt changes in the depth direction of the display position of the subtitles 24 and the surrounding parts that draw particular attention in the pictures.

[Specific Examples of Thin-Out Reproduction Including the Depth Adjustment Process on Pictures, Subtitles 24, etc.]

When selecting I-picture data from the video data 21 held in the memory 12 based on index information during thin-out reproduction, the next display picture selection portion 46 thins out I-pictures in keeping with the direction of reproduction and in accordance with the speed of thin-out reproduction.

After the next display picture selection portion 46 has selected the data of the I-picture to be displayed next, the video data read portion 47 reads the I-picture data from the memory 12.

The output portion 48 outputs the picture data read by the video data read portion 47 to the display section 51.

At this point, the output portion 48 may carry out the 3D picture creation process in FIG. 9 as needed in order to suppress abrupt changes in the display position of pictures in the depth direction during thin-out reproduction.

Basically, every time picture data is selected, the output portion 48 determines whether or not the 3D picture creation process is necessary.

If the output portion 48 determines whether the 3D picture creation process of FIG. 9 is necessary every time picture data is selected as described above, the picture data displayed as per an intrinsic depth can coexist with the picture data in 3D form in a plurality of pictures displayed continuously during thin-out reproduction.

Also, there is a possibility that the pictures with their depth adjusted and intrinsic pictures with their depth unadjusted switch frequently therebetween.

If the pictures continuously reproduced during thin-out reproduction switch frequency between the pictures in 3D form and the intrinsic pictures as mentioned above, the viewer 32 watching them can feel unease and uncomfortable.

Figure 10:
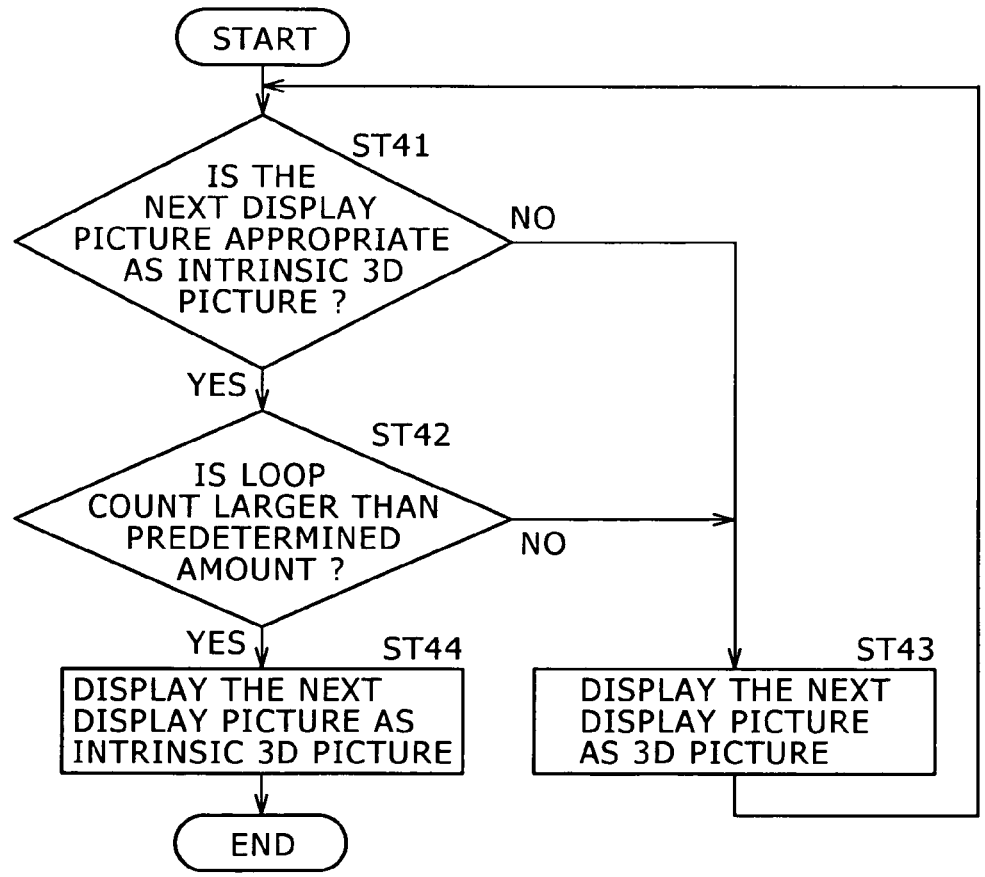
FIG. 10 is a flowchart of the process of determining whether or not the 3D picture creation process (depth adjustment process) is necessary for a predetermined time period after execution of the 3D picture creation process has been started.

Under these circumstances, upon carrying out the 3D picture creation process on given picture data, the output portion 48 controls the 3D picture creation process on subsequent picture data for a predetermined time period in accordance with the determination process shown in FIG. 10.

FIG. 10 is a flowchart of the process of determining whether or not the 3D picture creation process is necessary for a predetermined time period after execution of the 3D picture creation process has been started.

That is, upon 3D picture display, the process shown in FIG. 10 is performed so as to determine whether the 3D picture creation process is needed while the 3D picture display is underway.

In the flowchart of FIG. 10, the output portion 48 first determines whether the next display picture is appropriate as an intrinsic 3D picture (in step ST41).

For example, if the difference in depth between the display position of the last display picture (e.g., subtitles 24) and the display position of the newly selected picture (e.g., subtitles 24) is smaller than a predetermined value, then the output portion 48 determines that the next display picture is appropriate as an intrinsic 3D picture; otherwise the output portion 48 determines that the next display picture is not appropriate as a 3D picture.

If the result of the determination in step ST41 is negative ("NO"), the output portion 48 adjusts the display position of the selected next display picture in the depth direction, before outputting the adjusted data to the display section 51 (in step ST43).

The output portion 48 adjusts the display position of the next display picture in such a manner that the amount of change in the depth direction regarding the entire picture, display objects, subtitles 24, etc., falls within a predetermined value.

These steps may be called the next display picture 3D creation process in the ensuing description.

Thereafter, the output portion 48 again determines whether the next display picture is appropriate as an intrinsic 3D picture (in step ST41).

The output portion 48 carries out steps ST41 and ST43 in a loop until the next display picture becomes appropriate as an intrinsic 3D picture.

On the other hand, if the result of the determination in step ST41 is affirmative ("YES") because the next display picture is found appropriate as an intrinsic 3D picture, the output portion 48 determines whether the loop count is larger than a predetermined count (in step ST42).

In this case, the loop count means the number of times steps ST43 and ST41 are performed after the process of FIG. 10 has been started.

Before the predetermined loop count corresponding to the predetermined time period is exhausted, the output portion 48 makes a negative determination ("NO") in step ST42.

The output portion 48 adjusts the display position of the selected next display picture in the depth direction and outputs the adjusted data to the display section 51 (in step ST43).

In this manner, until the predetermined loop count (predetermined time period) is exhausted, the output portion 48 keeps outputting the next display picture in 3D form even if the next display picture is not appropriate as an intrinsic 3D picture.

If the loop count corresponding to the predetermined time period is exhausted and if the next display picture is found appropriate as an intrinsic 3D picture, the output portion 48 in step ST42 makes an affirmative determination ("YES") in step ST42.

The output portion 48 outputs the selected next display picture data unmodified to the display section 51 (in step ST44).

This enables the display section 51 to display the picture data in the intrinsic display position of the video data 21.

As described, during 3D picture display, the output portion 48 performs the process shown in FIG. 10 to determine whether the 3D picture creation process is needed.

Thus once the currently displayed picture is replaced by a 3D picture during thin-out reproduction of a 3D video, solely 3D pictures are displayed continuously for a predetermined time period thereafter, with no intrinsic pictures being displayed.

Therefore, frequent changeovers do not take place between the 3D pictures and the intrinsic pictures.

With the first embodiment, as described, once 3D pictures start being displayed for thin-out reproduction, changeover to the intrinsic pictures does not occur for a predetermined time period. The first embodiment thus minimizes the uneasy feeling the viewer may experience watching 3D pictures and intrinsic pictures switch therebetween frequently.

[Operation of Direct Changeover from Thin-Out Reproduction Mode to Ordinary Reproduction]

The changeover from thin-out reproduction mode to ordinary reproduction is started by the operation portion 14 giving the control section 20 an instruction for reproduction at ordinary speed based on the operations carried out during a thin-out reproduction process on the operation keys to which the reproduction function is assigned.

Based on the input instruction, the control section 20 causes the thin-out reproduction section 40 in FIG. 5 to perform ordinary reproduction.

In ordinary reproduction, the next display picture selection portion 46 selects, in turns, picture data from the video data 21 stored in the memory 12.

The next display picture selection portion 46 starts the selection from the picture data next to the picture data last selected during the thin-out reproduction process.

After the next display picture selection portion 46 has selected the picture data to be displayed next, the video data read portion 47 reads the selected picture data from the memory 12.

The output portion 48 outputs the picture data read by the video data read portion 47 to the display section 51.

When direct changeover from thin-out reproduction mode to ordinary reproduction is to be carried out, the output portion 48 may perform the process shown in FIG. 10 to determine whether the 3D picture creation process is needed.

For example, if the picture displayed at the end of thin-out reproduction is a 3D picture, then the output portion 48 may perform the process of FIG. 10 to determine whether the 3D picture creation process is necessary.

In carrying out the process of determining whether the 3D picture creation process is needed, the output portion 48 first determines whether the next display picture is appropriate as an intrinsic 3D picture (in step ST41).

If it is determined that the next display picture is appropriate, the output portion 48 determines whether the loop count has exceeded the predetermined count (in step ST42).

In the current context, the loop count means the number of times steps ST43 and ST41 are performed after the changeover from thin-out reproduction to ordinary reproduction.

The loop count thus defines the time period in which the current process is to be carried out.

Until the defined time period elapses, the output portion 48 makes a negative determination ("NO") in step ST42.

In the event of the negative determination in step ST41 or ST42, the output portion 48 adjusts the display position of the next display picture in the depth direction for ordinary reproduction and outputs the adjusted data to the output portion 51 (in step ST43).

For example, the output portion 48 may adjust the display position of the next display picture in the depth direction for ordinary reproduction in such a manner that the amount of change in the display position falls within a predetermined value.

Upon elapse of a predetermined time period following the changeover from thin-out reproduction to ordinary reproduction, the output portion 48 makes an affirmative determination ("YES") in step ST42.

The output portion 48 outputs the next display picture data for ordinary reproduction in unmodified form to the display section 51 (in step ST44).

This allows the display section 51 to display the picture data in its intrinsic display position.

By carrying out the above-described operation for changeover from thin-out reproduction to ordinary reproduction, the first embodiment minimizes abrupt changes in the display position of the video displayed immediately after the switch to ordinary reproduction.

Even if an instruction is given for changeover from ordinary reproduction to thin-out reproduction immediately after the instruction has been issued for changeover from thin-out reproduction to ordinary reproduction, the first embodiment continues the adjustment in the depth direction during such a short ordinary reproduction period.

Thus the first embodiment continues the depth adjustment for thin-out reproduction during a predetermined changeover period.

The first embodiment makes it difficult for abrupt changes to occur in the depth direction of pictures, display objects, subtitles 24, etc., the changes being attributable to repeated changeovers between ordinary reproduction and thin-out reproduction.

Alternatively, the operation of changeover from thin-out reproduction mode to ordinary reproduction may go through the process of FIG. 11, to be discussed later. Specifically, instead of direct changeover from "thin-out reproduction" to "ordinary reproduction," control may be changed first from "thin-out reproduction" to "pause" and then from "pause" to "ordinary reproduction." This makes it possible to display intrinsic 3D pictures immediately after the start of "ordinary reproduction."

Also in the case of changeover by way of "pause," the process in FIG. 10 may be carried out to determine whether the 3D picture creation process is necessary.

[Operation of Changeover from Pause Mode in Thin-Out Reproduction to Ordinary Reproduction]

When an instruction for pause is input from the operation portion 14 during thin-out reproduction, the control section 20 brings the thin-out reproduction function to a temporary halt.

This causes the output of new picture data to pause from the output portion 48 to the display section 51.

The display section 51 displays a 3D still picture based on the picture data last output from the output portion 48.

In pause mode during thin-out reproduction, the operation portion 14 gives the control section 20 an instruction for reproduction at ordinary speed based on the operations carried out on the operation keys to which the reproduction function is assigned.

Based on the input instruction, the control section 20 causes the thin-out reproduction section 40 shown in FIG. 5 to carry out ordinary reproduction.

Figure 11:
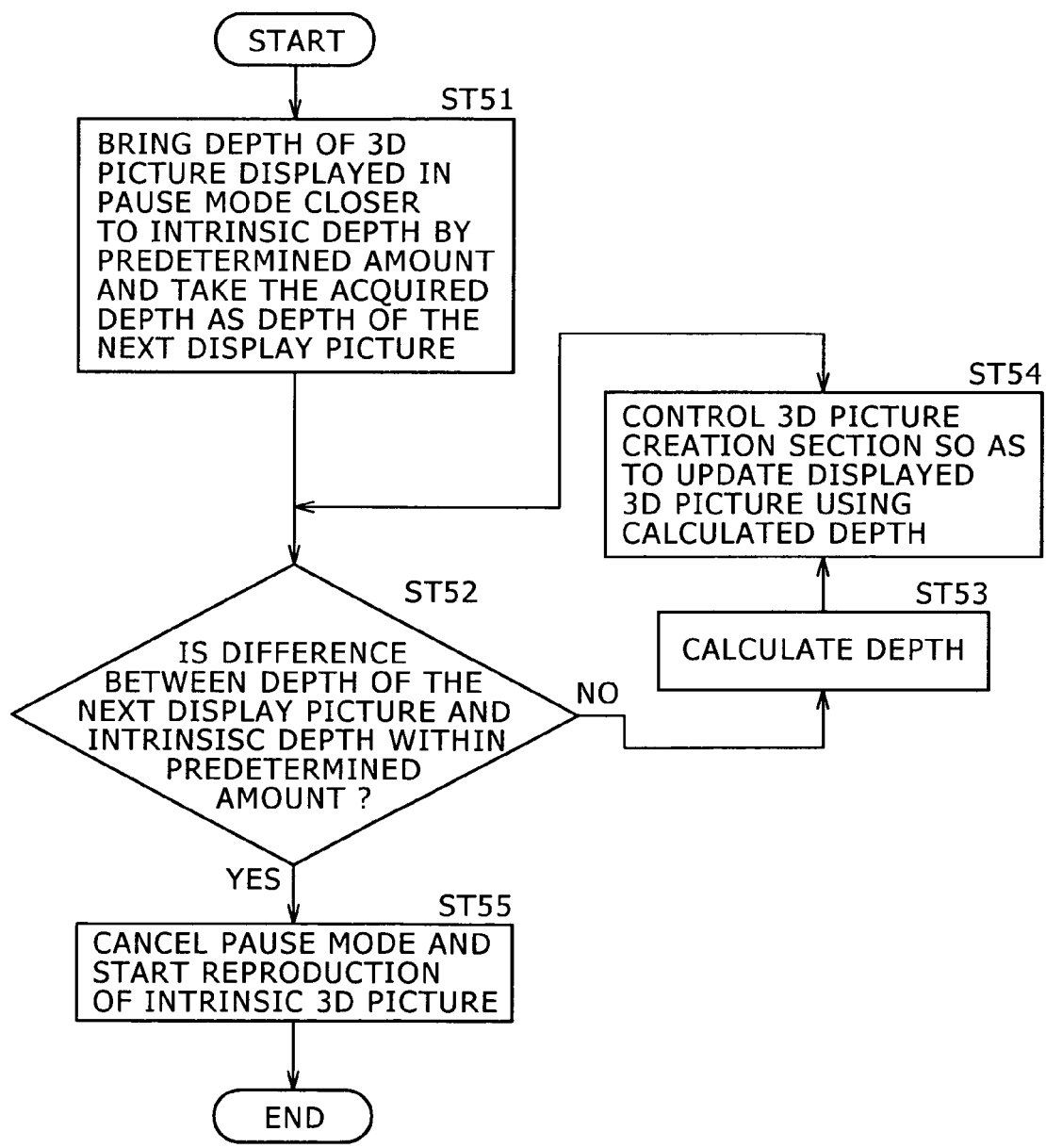
FIG. 11 is a flowchart of a 3D picture creation process (depth adjustment process) upon changeover from pause mode in thin-out reproduction to ordinary reproduction.

FIG. 11 is a flowchart of the 3D picture creation process (depth adjustment process) performed upon changeover from pause mode in thin-out reproduction to ordinary reproduction.

For example, when a 3D picture is being displayed in pause mode during thin-out reproduction, the output portion 48 may carry out the 3D picture creation process (depth adjustment process) in FIG. 11.

First, the output portion 48 brings the depth of the 3D picture displayed in pause mode closer to the intrinsic display position by a predetermined amount and takes the depth value thus acquired as the depth of the next display picture (in step ST51).

The output portion 48 adjusts the display position of the picture data read by the video data read portion 47 to the newly acquired display position, and outputs the adjusted data to the output portion 51.

Then the next display picture selection portion 46 determines whether the difference between the display position of the picture data output anew by the output portion 48 and the intrinsic display position falls within a predetermined value (in step ST52).

If it is determined that the difference between the new display position and the intrinsic display position exceeds the predetermined value, the output portion 48 calculates a value obtained by bringing the display position of the currently displayed 3D picture closer to the intrinsic display position by a predetermined amount, and takes the value thus calculated as the depth of the next display picture (in step ST53).

The output portion 48 adjusts the display position of the picture data read by the video data read portion 47 to the new display position, and outputs the adjusted data to the display section 51 (in step ST54).

When the difference between the display position of the next display picture and the intrinsic display position comes to fall with the predetermined value, the next display picture selection portion 46 makes a positive determination in step ST52.

The next display picture selection portion 46 selects the picture data to be displayed next from the video data 21 stored in the memory 12 (in step ST55).

Once the picture data to be displayed next is selected by the next display picture selection portion 46, the video data read portion 47 reads the selected picture data from the memory 12.

The output portion 48 outputs the picture data read by the video data read portion 47 to the display section 51.

In this case, the output portion 48 outputs the newly read picture data to the output portion 51 without subjecting the data to the 3D picture creation process.

Through the above-described operation of changeover from pause mode in thin-out reproduction to ordinary reproduction, it is possible to minimize abrupt changes in the display position of the video upon changeover to ordinary reproduction.

Even if the instruction for changeover to ordinary reproduction is given while the video data for thin-out reproduction is being displayed in pause mode on the display section 51, abrupt changes in the depth direction can be suppressed before and after the changeover.

<2. Second Embodiment>

[Configuration of the Reproduction System 1 and its Selection Operations]

The configuration of the reproduction system 1 as the second embodiment and its operations are substantially the same as those of the first embodiment. Thus in the ensuing description, like reference numerals used in the first embodiment are also used to designate like or corresponding components in the second embodiment, and their descriptions are omitted where redundant.

The second embodiment acquires depth change and time change scores of the display position regarding a plurality of candidate picture data, and selects the picture data having the smallest scores.

Figure 12:
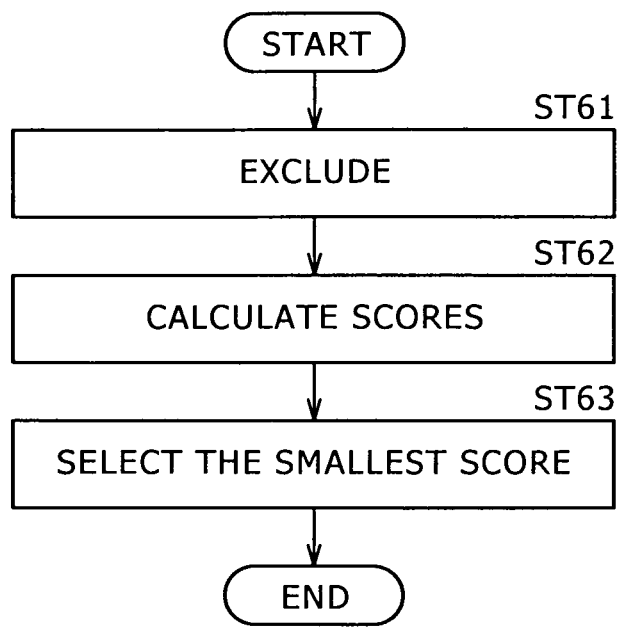
FIG. 12 is a flowchart of a next display picture selection process performed on next display picture candidates by a second embodiment of the present disclosure.

FIG. 12 is a flowchart of a next display picture selection process performed on next display picture candidates by the second embodiment of the present disclosure.

When time difference information about a plurality of candidate picture data and depth information about the subtitles 24 in the picture data are stored into the memory 12, the next display picture selection portion 46 proceeds to select the next display picture.

First, the next display picture selection portion 46 excludes from the plurality of candidate picture data those data of which the time difference or display position depth difference exceeds a corresponding upper limit (in step ST61).

The upper limit of time differences may be adjusted to a subjectively evaluated value. For example, a typical time difference upper limit may be set to 25 percent.

Home-use appliances are designed to have only several speed levels in the first place. For this reason, the upper limit of time differences need not be set fixedly to 25 percent or some other fixed value (rate).

Alternatively, the upper limits of time differences at stepped fast-forward reproduction speeds may be listed in a table.

As another alternative, in the case of high-end equipment such as broadcasting devices cable of having their fast-forward speed changed in stepless fashion, the upper limit of time differences may be calculated using a suitable arithmetic expression such as one given below.

The time difference upper limit is about 25 percent for 10× speed and eight percent for 100× speed.
(Arithmetic Expression for Calculating the Time Difference Upper Limit)

$$\text{Time difference upper limit (\%)} = 80 \div (\text{fast-forward speed})^{1/2}$$

The upper limit of depth differences in the display position may also be adjusted to a subjectively evaluated value.

For example, the upper limit of depth differences in the display position may be set to two degrees capping the amount of change in parallactic angle θ.

Depending on the format of the video data 21, it may be necessary to convert the depth amount of the display position into the amount of change in parallactic angle θ.

The next display picture selection portion 46 then calculates the scores of the remaining candidate picture data (in step ST62).

The next display picture selection portion 46 calculates the cores by weighting both the amount of change in speed and the amount of change in depth.

For example, the next display picture selection portion 46 may calculate the scores of each candidate picture based on the arithmetic expression given below.
(Arithmetic Expression for Calculating the Scores)

$$\text{Penalty} = \text{rate of change (\%) in thin-out reproduction speed} + 10 \times [\text{amount of change in parallactic angle (degrees)}]^2$$

If the range of change in fast-forward speed is zero percent and the amount of change in parallactic angle θ is one degree, the penalty is 10.

If the range of change in fast-forward speed is 10 percent and the amount of change in parallactic angle θ is 0.5 degrees, the penalty is 12.5.

If the range of change in fast-forward speed is 25 percent and the amount of change in parallactic angle θ is 0.1 degree, the penalty is 25.1.

The next display picture selection portion 46 then selects the picture having the smallest scores calculated (in step ST63).

After the next display picture selection portion 46 has selected the picture data to be displayed next, the video data read portion 47 reads the selected picture data from the memory 12.

The output portion 48 outputs the picture data read by the video data read portion 47 to the display section 51.

If the output portion 48 has been notified that the next display picture is not appropriate, the output portion 48 adjusts the display position of the picture, display objects, subtitles 24, etc., in the picture data and outputs the adjusted data to the display section 51.

The display section 51 displays the newly input picture data.

This allows the display section 51 to display 3D moving pictures in thin-out reproduction.

Also, the display section 51 updates the depth information held in the last display picture depth information buffer 45.

The second embodiment excludes the pictures of which the amount of change in the instructed thin-out reproduction speed exceeds its upper limit as well as the pictures of which the amount of change in the depth direction of the display position exceeds its upper limit, and evaluates the remaining pictures so as to select the candidate image data found to have the smallest amounts of such changes.

In this manner, the second embodiment suppresses extreme variations in reproduction speed and abrupt changes in the depth direction of the display position. Furthermore, the second embodiment provides 3D moving pictures for thin-out reproduction in such a manner as to minimize the fluctuations in reproduction speed and ensure more smoothed-out changes in the depth direction of the display position.

<3. Third Embodiment>
[Configuration of the Reproduction System 1 and its Selection Operations]

The configuration of the reproduction system 1 as the third embodiment and its operations are substantially the same as those of the first embodiment. Thus in the ensuing description, like reference numerals used in the first embodiment are also used to designate like or corresponding components in the third embodiment, and their descriptions are omitted where redundant.

The third embodiment selects the picture data having the smallest amount of time change from among a plurality of candidate picture data of which the amount of change in the depth direction of the display position is smaller than a predetermined value.

Figure 13:
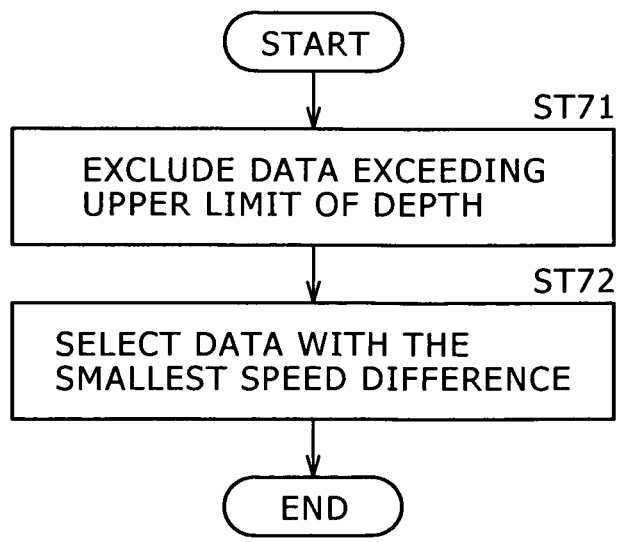
FIG. 13 is a flowchart of a next display picture selection process performed on next display picture candidates by a third embodiment of the present disclosure.

FIG. 13 is a flowchart of a next display picture selection process performed on next display picture candidates by the third embodiment of the present disclosure.

After the time difference information about a plurality of candidate picture data and the depth information about the subtitles 24 in the picture data have been stored into the memory 12, the next display picture selection portion 46 selects the next display picture.

First, the next display picture selection portion 46 excludes from the plurality of candidate picture data those data of which the depth difference in the display position exceeds its upper limit (in step ST71).

The next display picture selection portion 46 then selects from the remaining candidate picture data the picture having the smallest amount of change in speed (in step ST72).

After the next display picture selection portion 46 has selected the picture data to be displayed next, the video data read portion 47 reads the selected picture data from the memory 12.

The output portion 48 outputs the picture data read by the video data read portion 47 to the display section 51.

If the output portion 48 has been notified that the next display picture is not appropriate, the output portion 48 adjusts the display position of the picture, display objects, subtitles 24, etc., in the picture data and outputs the adjusted data to the display section 51.

The display section 51 displays the newly input picture data.

This allows the display section 51 to display 3D moving pictures in thin-out reproduction.

Also, the display section 51 updates the depth information held in the last display picture depth information buffer 45.

The third embodiment excludes the pictures of which the amount of change in the depth direction of the display position exceeds its upper limit, and selects from the remaining pictures the candidate image data having the smallest amount of change in thin-out reproduction speed.

In this manner, the third embodiment can suppress abrupt changes in the depth direction of the display position of 3D moving pictures being displayed in thin-out reproduction.

Furthermore, the third embodiment can reduce the fluctuation in the speed of thin-out reproduction to a strict minimum.

Although the description above contains many specificities, these should not be construed as limiting the scope of the disclosure but as merely providing illustrations of some of the presently preferred embodiments of this disclosure. It is to be understood that changes and variations may be made without departing from the spirit or scope of the claims that follow.

For example, whereas the display device 3 was shown to be structured separately from the reproduction apparatus 2 in each of the above-described embodiments, this is an example.

Alternatively, the display device 3 may be structured integrally with the reproduction apparatus 2.

In each of the embodiments above, the acquired video data 21 was shown to be the video data 21 prepared for 3D reproduction.

Alternatively, the video data 21 may be video data 21 designed for 2D reproduction.

In this case, picture data for 3D reproduction may be created from the selected video data 21.

In each of the above-described embodiments, the video data 21 stored in the memory 12 was shown to have the depth information about the subtitles 24.

However, some video data 21 to be placed into the memory 12 may not have the depth information about the subtitles 24.

If the video data 21 having no depth information is to be recorded to the memory 12, a depth information creation portion may be provided to create depth information about the subtitles 24 and record the created information to the memory 12. In turn, the depth information read portion 44 may acquire the depth information thus created at the timing of recording.

Alternatively, the depth information read portion 44 may be arranged to create the depth information about the subtitles 24 upon thin-out reproduction or ordinary reproduction.

In each of the embodiments above, the display position of the subtitles 24 was shown to be adjusted in the depth direction based on the depth information about the display position of the subtitles 24. Alternatively, the video data 21 may be arranged to carry parallax information about the subtitles 24 or other objects. In this case, the depth of the display position for thin-out reproduction may be determined and adjusted based on the parallax information thus provided.

The present disclosure contains subject matter related to that disclosed in Japanese Priority Patent Application JP 2010-217252 filed in the Japan Patent Office on Sep. 28, 2010, the entire content of which is hereby incorporated by reference.

What is claimed is:

1. An electronic apparatus comprising:
   an acquisition portion operable to acquire video data having a plurality of picture data constituting a moving picture for reproduction of a three-dimensional moving picture;
   an operation portion operable to provide an instruction for one of fast-forward or fast-rewind reproduction of said plurality of picture data; and
   a selection portion operable to select in turns, picture data from said plurality of picture data for said one of fast-forward or fast-rewind reproduction of said three-dimensional moving picture, based on said instruction,
   wherein said selection portion selects said picture data in which a display position relative to a last-selected picture is subject to a limited change in a direction of depth.

2. The electronic apparatus according to claim 1, wherein, from said plurality of picture data acquired for three-dimensional moving picture reproduction, said selection portion selects said picture data for three-dimensional moving picture reproduction in turns corresponding to a direction of reproduction; in each turn for picture data selection, said selection portion selects selection-reference picture data to be selected corresponding to an instructed reproduction speed and said picture data at least either preceding or following said selected selection-reference picture data, as a plurality of candidate picture data; and from said plurality of candidate picture data, said selection portion selects said picture data in which said display position relative to said last-selected picture is subject to a limited change in said depth direction.

3. The electronic apparatus according to claim 2, wherein, in each turn for picture data selection, said selection portion selects picture data from said plurality of candidate picture data based on an evaluation of an amount of change in said instructed reproduction speed in effect when each one of said plurality of candidate picture data is selected and on an evaluation of an amount of change in said display position of the selected candidate picture data in said depth direction relative to said last-selected picture.

4. The electronic apparatus according to claim 1, further comprising a depth adjustment portion configured operable to adjust said display position of said picture data selected by said selection portion for thin-out reproduction, in such a manner as to bring into a predetermined range an amount of change in said display position of a current picture in reference to a display position of said last-selected picture.

5. The electronic apparatus according to claim 4, wherein said depth adjustment portion determines whether or not a display position adjustment process is necessary on each of said picture data selected by said selection portion for reproduction; if it is determined that said display position adjustment process is necessary, said depth adjustment portion performs said display position adjustment process on said selected picture data, and said depth adjustment portion continues said display position adjustment process on said selected picture data for a predetermined time period following a start of said display position adjustment process.

6. The electronic apparatus according to claim 4, wherein said operation portion gives instructions for a changeover from said one of fast-forward or fast-rewind reproduction to ordinary reproduction and for a changeover from ordinary reproduction to said one of fast-forward or fast-rewind reproduction;

wherein, based on a most recent changeover instruction, said selection portion changes between thin-out selection mode and continuous selection mode said selection of picture data from said plurality of picture data acquired for three-dimensional moving picture reproduction; and wherein, for a predetermined time period after said depth adjustment portion has given said instruction for a changeover from said one of fast-forward or fast-rewind reproduction to ordinary reproduction, said depth adjustment portion continues said display position adjustment process on said picture data selected by said selection portion for ordinary reproduction with regard to said display position of said picture data.

7. The electronic apparatus according to claim 4, wherein said operation portion gives an instruction for a changeover to ordinary reproduction during paused display of said picture data for said one of fast-forward or fast-rewind reproduction, based on the changeover instruction, said depth adjustment portion updates a picture displayed in pause mode in such a manner that a display position of said picture in question comes close to an intrinsic display position thereof, and when said display position of said picture displayed in pause mode comes close to said intrinsic display position thereof, said selection portion starts selecting said picture data for ordinary reproduction.

8. The electronic apparatus according to claim 1, wherein said selection portion determines an amount of change in said display position of each of a plurality of candidate picture data, on the basis of a display position of a part of interest in said picture data.

9. The electronic apparatus according to claim 8, wherein said selection portion determines said amount of change in said display position of each of said plurality of candidate picture data, on the basis of a display position of subtitles in said picture data.

10. The electronic apparatus according to claim 1, wherein, in each turn for picture data selection, if an amount of change in a display position of a selection-reference picture data in said depth direction is smaller than a predetermined value, then said selection portion selects said selection-reference picture data, and if said amount of change in said display position of said selection-reference picture data in said depth direction is larger than said predetermined value, then said selection portion evaluates an amount of change in a display position of each of the remaining picture data in descending order of the amounts of change in the reproduction speed of the picture data, so as to select said picture data of which the amount of change in said display position falls within said predetermined value for the first time in a current turn.

11. The electronic apparatus according to claim 1, wherein, in each turn for picture data selection, said selection portion excludes from said plurality of candidate picture data those picture data of which either an amount of change in said reproduction speed or an amount of change in said display position in said depth direction is larger than a corresponding upper limit, said selection portion evaluates said amount of change in said reproduction speed of each of the remaining candidate picture data and an amount of change in a parallactic angle stemming from said amount of change in said display position of said candidate picture data in question, and said selection portion selects said candidate picture data in which the evaluated amounts of change are the smallest.

12. The electronic apparatus according to claim 1, wherein, in each turn for picture data selection, said selection portion excludes from said plurality of picture data those picture data of which an amount of change in a parallactic angle stemming from an amount of change in said display position in said depth direction is larger than a predetermined upper limit, and said selection portion selects from remaining candidate picture data said picture data in which an amount of change in said reproduction speed is the smallest.

13. A reproduction system comprising:
a display apparatus operable to display moving pictures; and
a reproduction apparatus operable to output a three-dimensional moving picture to said display apparatus,
wherein said reproduction apparatus comprises:
an acquisition portion operable to acquire video data having a plurality of picture data constituting a moving picture for reproduction of said three-dimensional moving picture,
an operation portion operable to provide an instruction for one of fast-forward or fast-rewind reproduction of said plurality of picture data, and
a selection portion operable to select in turns picture data from said plurality of picture data for said one of fast-forward or fast-rewind reproduction of said three-dimensional moving picture, based on said instruction, and said selection portion selects said picture data in which a display position relative to a last-selected picture is subject to a limited change in a direction of depth.

14. A reproduction method, comprising:
in an electronic apparatus having an acquisition portion, an operation portion and a selection portion:
causing said acquisition portion to acquire video data having a plurality of picture data constituting a moving picture for reproduction of a three-dimensional moving picture;
causing said operation portion to provide an instruction for one of fast-forward or fast-rewind reproduction of said plurality of picture data; and
causing said selection portion to select in turns, picture data from said plurality of picture data for said one of fast-forward or fast-rewind reproduction of the three-dimensional moving picture, based on said instruction;
wherein said selection portion is caused to select said picture data in which a display position relative to a last-selected picture is subject to a limited change in a direction of depth.

15. A non-transitory computer-readable storage medium having stored thereon, a computer program having at least one code section for processing, the at least one code section being executable by a computer for causing the computer to perform steps comprising:
acquiring video data having a plurality of picture data constituting a moving picture for reproduction of a three-dimensional moving picture;
receiving an instruction for one of fast-forward or fast-rewind reproduction of said plurality of picture data; and
selecting in turns, picture data from said plurality of picture data for said one of fast-forward or fast-rewind reproduction of said three-dimensional moving picture, based on said instruction having been input, wherein said picture data is selected in which a display position relative to a last-selected picture is subject to a limited change in a direction of depth.

* * * * *